United States Patent
Oliver et al.

(10) Patent No.: US 12,093,384 B1
(45) Date of Patent: Sep. 17, 2024

(54) TECHNIQUES FOR IMPROVED INSPECTION OF CONTAINER LAYERS

(71) Applicant: Wiz, Inc., New York, NY (US)

(72) Inventors: Yaniv Joseph Oliver, Tel Aviv (IL); Ami Luttwak, Binyamina (IL); Yinon Costica, Tel Aviv (IL); Roy Reznik, Tel Aviv (IL); Yaniv Shaked, Tel Aviv (IL); Amir Lande Blau, Tel Aviv (IL)

(73) Assignee: Wiz, Inc., New York, NY (US)

( * ) Notice: Subject to any disclaimer, the term of this patent is extended or adjusted under 35 U.S.C. 154(b) by 196 days.

(21) Appl. No.: 17/809,993

(22) Filed: Jun. 30, 2022

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
CPC ............... G06F 21/00–577; G06F 221/034
See application file for complete search history.

(56) References Cited

U.S. PATENT DOCUMENTS

| | | | |
|---|---|---|---|
| 10,032,032 B2 | 7/2018 | Suarez et al. | |
| 10,223,534 B2 | 3/2019 | Stopel et al. | |
| 10,997,293 B2 | 5/2021 | Wiest et al. | |
| 11,704,408 B1* | 7/2023 | Ciubotariu | G06F 21/565 726/23 |
| 2017/0109536 A1* | 4/2017 | Stopel | G06F 21/577 |
| 2023/0252157 A1* | 8/2023 | Pieczul | G06F 21/554 726/25 |
| 2023/0315860 A1* | 10/2023 | Yaron | G06F 21/577 726/25 |

FOREIGN PATENT DOCUMENTS

WO   WO-2022253537 A1 * 12/2022 ........... G06F 21/562

OTHER PUBLICATIONS

Scarfone, Karen, et al. "Technical Guide to Information Security Testing and Assessment." Recommendations of the National Institute of Standards and Technology, Sep. 2008, https://doi.org/10.6028/nist.sp.800-115. Date accessed May 13, 2024.

* cited by examiner

*Primary Examiner* — Trong H Nguyen
(74) *Attorney, Agent, or Firm* — M&B IP Analysts, LLC (57) ABSTRACT

A system and method for detecting a cybersecurity object in operating system-level virtualization objects. The method comprises: inspecting a first image of an operating system-level virtualization for a cybersecurity object; inspecting a second image for the cybersecurity object, wherein the second image is based off of the first image; associating the cybersecurity object with the first image, in response to detecting the cybersecurity object in the first image and detecting the cybersecurity object in the second image; and associating the cybersecurity object with the second image, in response to detecting the cybersecurity object in the second image and not detecting the cybersecurity object in the first image.

17 Claims, 7 Drawing Sheets

TECHNIQUES FOR IMPROVED INSPECTION OF CONTAINER LAYERS

TECHNICAL FIELD

The present disclosure relates generally to detecting cybersecurity threats, and specifically to detecting cybersecurity threats in operating system level virtualizations.

BACKGROUND

Operating system level virtualization describes various endeavors which attempt to efficiently provision hardware resources (virtualization), while keeping such provisions contained within themselves, so that other tenants on the same system are not able to access each other's systems, files, etc., unless such access is specifically granted.

A container is deployed in a cloud computing environment, such as a virtual private cloud (VPC) of a cloud computing infrastructure, such as Amazon® Web Services (AWS), Google® Cloud Platform (GCP), Microsoft® Azure, and the like. A container is deployed by a container engine, such as RKT, Docker®, and the like, from a mount point of a container image. A container image may be generated based on multiple container images, also known as layers. A layer is generated whenever a change is made to the container image, such as installing an application, adding a file, removing a file, updating a registry value, and the like operations.

As such, a container image may ostensibly contain therein cybersecurity threats, secrets, vulnerabilities, exposures, and the like in a layer which is beneath the mounted layer. This can lead to missing cybersecurity threats when scanning a live container for such cybersecurity threats. Scanning each layer of a container image in order to detect cybersecurity threats may likewise be inefficient, due to processing and storage which need to be devoted to completing scanning processes.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a cybersecurity object in operating system-level virtualization objects. The method comprises: inspecting a first image of an operating system-level virtualization for a cybersecurity object; inspecting a second image for the cybersecurity object, wherein the second image is based off of the first image; associating the cybersecurity object with the first image, in response to detecting the cybersecurity object in the first image and detecting the cybersecurity object in the second image; and associating the cybersecurity object with the second image, in response to detecting the cybersecurity object in the second image and not detecting the cybersecurity object in the first image.

Certain embodiments disclosed herein also include a non-transitory computer readable medium having stored thereon causing a processing circuitry to execute a process, the process comprising: inspecting a first image of an operating system-level virtualization for a cybersecurity object; inspecting a second image for the cybersecurity object, wherein the second image is based off of the first image; associating the cybersecurity object with the first image, in response to detecting the cybersecurity object in the first image and detecting the cybersecurity object in the second image; and associating the cybersecurity object with the second image, in response to detecting the cybersecurity object in the second image and not detecting the cybersecurity object in the first image.

Certain embodiments disclosed herein also include a system for detecting a cybersecurity object in operating system-level virtualization objects. The system comprises: a processing circuitry; and a memory, the memory containing instructions that, when executed by the processing circuitry, configure the system to: inspect a first image of an operating system-level virtualization for a cybersecurity object; inspect a second image for the cybersecurity object, wherein the second image is based off of the first image; associate the cybersecurity object with the first image, in response to detecting the cybersecurity object in the first image and detecting the cybersecurity object in the second image; and associate the cybersecurity object with the second image, in response to detecting the cybersecurity object in the second image and not detecting the cybersecurity object in the first image.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various example embodiments, disclosed herein, include a method and system for detecting cybersecurity threats in operating system level virtualizations, colloquially known as containers, and container images. A container is a software package which includes an application and a dependency necessary to run the application. A dependency may be, for example, a library, a binary, and the like. Therefore, a container virtualized the operating system and allows the container to run anywhere. Scanning live containers for cybersecurity threats may lead to missing threats which exist in a layer which is not the layer from which the live container was mounted. Likewise, scanning a container image layer by layer is inefficient due to processing and storage which need to be devoted to completing scanning processes. Furthermore, when a layer by layer scan is performed, and a cybersecurity threat is detected on a first layer, a system performing such detection would detect the threat again for each subsequent layer on which the first layer is based, thereby misleading that multiple cybersecurity threats exist, where in practice a single one does.

The system disclosed is configured to perform an inspection method which overcomes these scanning issues by inspecting a bottom layer for cybersecurity threats, generating a diff between the bottom layer and a next (i.e., upper) layer, inspecting objects from the diff, and associating any detected cybersecurity threat with the appropriate layer. A diff may be generated, for example, by a container engine. The container engine is configured to receive a first container image and a second container image, and produce a result which includes an object which is in the first container image and not the second container image, in the second container image but not the first container image, and the like. In an embodiment, a diff is a file which includes therein objects, object identifiers, and the like, which are different between the first container image and the second container image. A different object may be, for example, an object that was modified, an object that was written, an object that was deleted, and the like. An object may be, for example, an application, a binary code, a software library, a secret, a policy, a cryptographic key, a registry update, and the like.

By inspecting a container image, and only objects based on the generated diff between the container image and another container image, resource usage is reduced as redundant inspection does not occur. Furthermore, the method allows to accurately pinpoint a detected cybersecurity threat to an identifiable layer, which in turn allows mitigating such cybersecurity threats in an efficient manner, without having to guess what change in the container image resulted in the cybersecurity threat occurring.

Furthermore, in certain embodiments, a live container may be inspected, and a diff generated between the live container and the container image from which the live container was mounted. By generating a diff between the live container and the container image from which the live container was deployed, it is possible to inspect only those objects which were different between the container image and the live container. Where such objects are present on the live container, this allows to reduce the amount of objects which would otherwise be inspected by doing a full inspection of the live container (i.e., inspecting every object in the live container). Such an inspection not only reduces use of processing and storage resources for inspection, but also reduces bandwidth devoted by the live container to an inspector, thereby minimizing the effects of performing an inspection on the live container.

While it is noted that humans can read computer code and detect cybersecurity threats to an extent, it is recognized that such detection is unreliable and inconsistent. This is due in part to a human operator applying subjective criteria by which a cybersecurity threat is detected or classified. For example, two human operators may not agree on that the same cybersecurity threat has the same severity. In fact, the same human operator may assign the same cybersecurity threat a different level of severity due to applying subjective criteria. Human operators may also not agree on what does or does not constitute a cybersecurity threat. For example, a human operator applying their own subjective criteria may decide that a container image which includes a detected cybersecurity threat does not in fact include that detected threat, because a container is not deployed based on the container image, therefore there is no perceived risk. As another example, a human operator applying subjective criteria may determine that a cybersecurity threat does not exist merely because it is on a top layer of the container image. As yet another example, a human operator may attempt to 'cut corners' by only inspecting some layers of a container image and not others, in order to decrease the amount of time spent on such inspection.

Furthermore, operating system (OS)-level virtualizations are spun up (i.e., deployed) and spun down (i.e., deprovisioned) at paces which can be hundreds or thousands in a matter of seconds. A human operator cannot successfully apply objective criteria to inspect for thousands of known cybersecurity threats within such small timeframes.

The disclosed system addresses at least these issues by applying objective criteria with which to detect cybersecurity threats, and by generating diffs and further inspecting objects detected in the diffs, resulting in an inspection process which is efficient, reliable, and objective.

Figure 1:
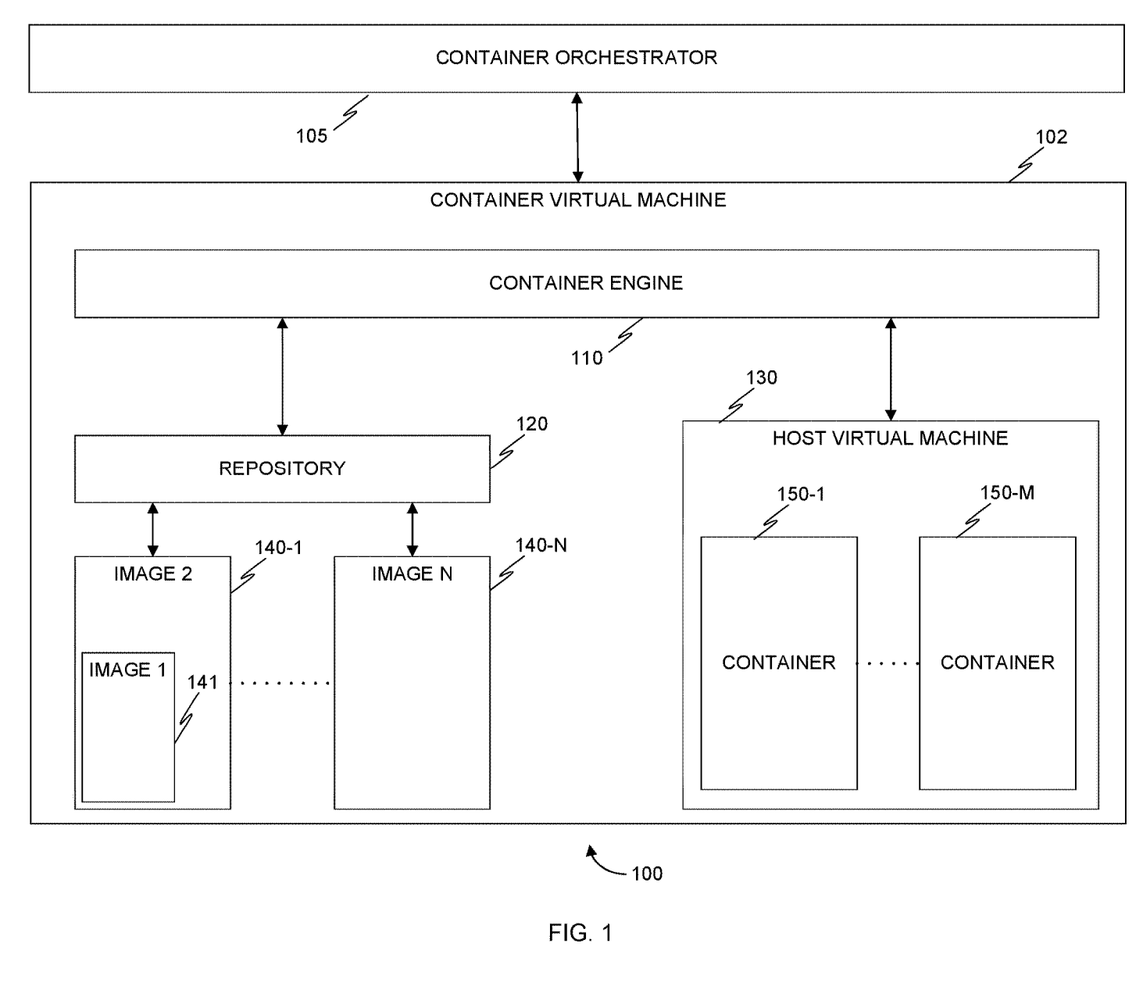
FIG. 1 is a diagram of a container deployment, utilized to describe some of the disclosed embodiments.

FIG. 1 is an example diagram of a container deployment 100, utilized to describe some of the disclosed embodiments. A container engine 110 is a software application which is deployed in a cloud computing environment (or infrastructure). In an embodiment, a container engine 110 is configured to receive user input, process input and other communication with a container orchestrator, pull container images from a repository server, generating a mount point from a container image, generating metadata based on a container image, and the like. In certain embodiments, the container engine 110 is further configured to call a container runtime to actually deploy a container from a container image. A container engine may be, for example, Docker®. A container runtime may be, for example, runc.

In an embodiment, the container engine 110 may be deployed in a container virtual machine 102, which is a virtual machine on which a container engine 110 is run. In some embodiments, the container virtual machine is communicatively coupled with a container orchestrator 105. A container orchestrator 105 may be communicatively coupled with a plurality of container virtual machines 102, each container virtual machine 102 running a container engine 110. For example, a container orchestrator 105 may be a Kubernetes® container orchestration system, while the container engine 110 is a Docker® Engine.

The container engine 110 is configured to pull container images which are stored in a repository 120. In an embodiment, the repository 120 is implemented as a storage, and exposed by a server (not depicted) with which the container engine 110 communicates, for example over a network interface, in order to pull container images therefrom, for example based on an image identifier.

A repository 120 may host a plurality of container images, such as container images 140-1 through 140-N, individually referenced as container image 140, generally referenced as container images 140, where 'N' is an integer having a value of '2' or more.

Each container image 140 may in turn include additional container images, which are also referred to as layers. A container image (layer) is generated when a build command is performed on a first container image. For example, a first container image (i.e., a parent image) 141 is generated by a first build command. A second build command causes a second image (i.e., a child image) 140-1 to be generated, which is based off of the first container imager 141.

In container deployments, a base image is a container image from which other container images may be generated, and that has no parent image. In an embodiment, a base image includes an operating system, and software tools which allow to install software packages or otherwise update the container image. In the example above, the first container image 141 is a base image. A second image 140-1 may include a plurality of layers, which are not shown here for simplicity.

In an embodiment, any one of the container images 140 may be intermediate images, which are sometimes erroneously referred to as base images. Intermediate images are images which include a base image, and also include at least an additional layer which adds functionality to the deployed container. In order to keep the number of layers small, a multi-stage build process may be utilized. For example, in Docker® multiple FROM statements may be used to call different base images, each of which begins a new stage in the build. Objects may be selected from one stage to the next, which allows discarding unselected objects from the final image.

Where a container image 140 may include multiple images, such as container image 140-1 which includes container image 141, a container engine 110 will typically specify a mount point from which the live container is deployed. The container engine 110 may deploy, or may otherwise configure another workload to deploy, a live container. For example, the container engine 110 may configure a host virtual machine (VM) 130 to deploy thereon a plurality of containers 150-1 through 150-M, individually referenced as container 150 and generally referenced as containers 150, where 'M' is an integer having a value of '2' or greater.

In an embodiment, the VM 130 may run a host, such as Red Hat® Enterprise Linux (RHEL) Atomic Host, which runs containerized processes (i.e., containers) provisioning resources from the VM 130. In other embodiments, the host application (e.g., RHEL Atomic Host) may run as a virtual instance in a cloud computing environment, as a local machine (i.e., bare metal) in a network environment, and the like.

In an embodiment, the container engine 110 is further configured to generate diffs. A diff is a term which refers to a difference, in this case a difference between a first container image 141 and a second container image 140-1. A diff may also be generated between a container image 140-N and a live container 150-1 which is deployed based on the container image 140-N. Generation of diffs is discussed in more detail with respect to FIG. 3 below.

Figure 2:
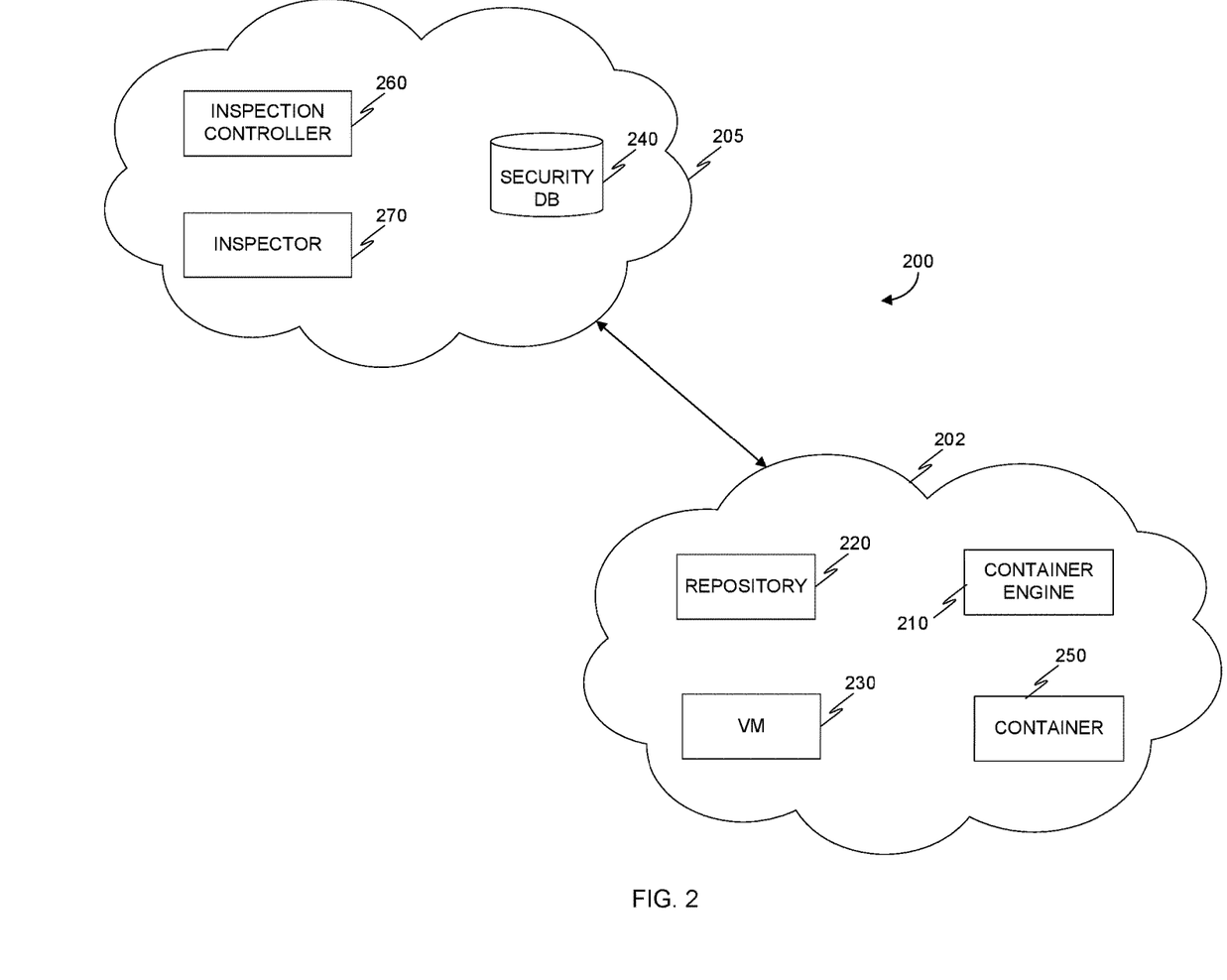
FIG. 2 is a network diagram including a production environment and an inspection environment, utilized to describe an embodiment.

FIG. 2 is an example network diagram 200 including a production environment 202 and an inspection environment 205, utilized to describe an embodiment. A production environment 202 is a cloud computing environment which provides services and resources to client devices. A client device (not shown) may be for example a laptop computer, personal computer, other computing device which is in a network external to the cloud computing environment, and the like. The production environment 202 may be implemented, for example, as a VPC on a cloud computing infrastructure, such as Amazon® Web Services (AWS), Google® Cloud Platform (GCP), Microsoft® Azure, and the like.

In an embodiment, the production environment 202 includes cloud entities, such as resources and principals. A resource is a cloud entity which supplies functionality, such as processing power, memory, storage, communication, and the like. A resource may supply more than one functionality. Resources may include, for example, virtual machines (VMs), such as VM 230, container engines such as container engine 210, serverless functions (not shown), and the like.

In an embodiment, the production environment 202 may further include an application programming interface (API), through which actions in the cloud environment may be triggered. A container engine 210 may be implemented using Kubernetes® or Docker®. A serverless function may implemented using Lambda®. A VM 230 may be implemented using Oracle® VirtualBox, Azure Virtual Machines, and the like. In certain embodiments, the container engine 210 may configure a VM 230 to run a containerized application 250 (also referred to as container 250). The container engine 210 is configured to access a repository 220, such as AWS Elastic Container Registry (ECS), from which an image is pulled and mounted at a mount point to generate a live container, such as container 250.

A principal is a cloud entity which acts on a resource, meaning it can request, or otherwise initiate, actions or operations in the cloud environment which cause a resource to perform a function. A principal may be, for example, a user account, a service account, a role, and the like. In an embodiment, a principal is implemented as a data structure which includes information about an entity, such as a username, a password hash, an associated role, and the like. In an embodiment, a principal may include a privilege which allows the principal to configure the container engine 210 to run a container.

The production environment 202 is connected with an inspection environment 205. The inspection environment 205 is a cloud computing environment. In an embodiment, the inspection environment 205 is deployed on a cloud computing infrastructure shared with the production environment 202, in another cloud computing infrastructure not shared with the production environment 202, or a combination thereof. In certain embodiments, a portion of the inspection environment 205 is deployed in the cloud production environment 202. In some embodiments, certain workloads deployed in the inspection environment 205 may be deployed in the production environment 205. For example, the inspection environment 205 may access a principal, such as a service account, which allows the inspection environment 205 to initiate actions in the production environment 202.

The inspection environment 205 includes a plurality of inspector workloads, such as inspector 270. In an embodiment, the inspector 270 is configured to inspect virtual instances, such as container images, of the production environment 202 for cybersecurity threats. The inspector 270 may inspect a container, a container image, and the like, for security objects, such as secrets, keys, user account information, and the like. In some embodiments, the inspector 270 is configured to inspect the virtual instance for an application, an operating system, a binary file, a library file, a combination thereof, and the like.

The inspection environment 205 further includes a security database 240, which is a graph database. A security graph may be stored on the security database 240. The security graph includes a representation of the production environment 202. For example, cloud entities of the production environment 202 may be represented each as nodes in the security graph. In an embodiment, the security graph is generated based on objects detected by an inspector, such as inspector 270. In certain embodiments, a virtual instance (e.g., a virtual machine) is represented by a node stored in the security graph. A container, such as container 250, and a corresponding image from which the container was mounted, are also represented each by a node, wherein the node representing the container 250 is connected to a node representing the virtual instance (i.e., VM 230) which runs the container 250. In certain embodiments, generating an instruction to inspect a virtual instance (i.e., container 250) further includes querying a security graph to determine an identifier of a container image represented by a node which is connected to a node representing the container 250.

An inspection controller 260 (also referred to as controller 260) is further included in the inspection environment 205. In an embodiment, the controller 260 is a workload deployed in the inspection environment 205 which is configured to initiate inspection of cloud entities of the production environment 202, such as the cloud entities discussed above. For example, initiating inspection may include determining what cloud entities to inspect, when to inspect them, and the like.

Inspecting virtual instances, such as container 250, is a process which utilizes resources from the production environment 202, such as processing power (measured as I/O per second—IOPS), storage (e.g., for generating a snapshot which is stored and inspected), and the like. Further, while a live container is being inspected, the instance is able to devote less of its own resources to serving its purpose (e.g., providing a service) as those resources are directed in part to the inspection process, such as sending and receiving communication from an inspector 270. Therefore, it is advantageous to reduce this usage to a minimum, while still being able to inspect the entire contents of the container for cybersecurity threats.

In an embodiment, the controller 260 may be configured to instruct the container engine 210 to generate a diff between a first container image, and a second container image. In another embodiment, the controller 260 may be configured to instruct the container engine 210 to generate a diff between a live container (i.e., container 250) and an image from which the live container was deployed. The controller 260 may be further configured to instruct an inspector 270 to inspect, for example, objects which are part of the diff results, as well as image from which the live container was deployed. This is discussed in more detail with respect to FIG. 3 below.

Figure 3:
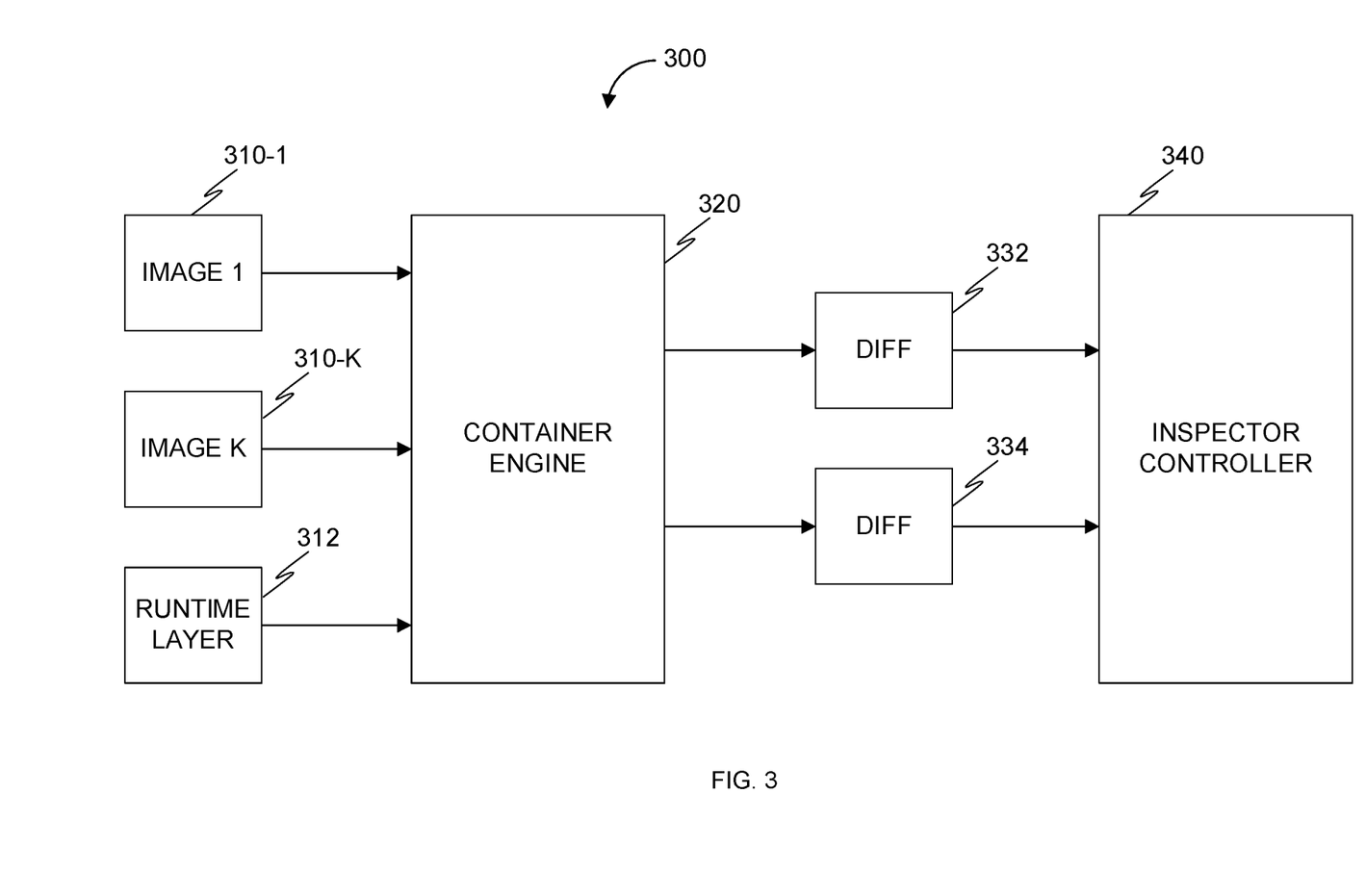
FIG. 3 is a schematic illustration of a diff generation flow, utilized to describe an embodiment.

FIG. 3 is an example schematic illustration of a diff generation flow 300, utilized to describe an embodiment. A container engine 320, such as the Docker® engine, is configured to receive an instruction to generate a diff between a first container image and a second container image. In an embodiment, a container image (other than a base image) includes a plurality of container layers. Each container layer is a container image in and of itself. Each container layer corresponds to an instruction stored in a build file, such as a Dockerfile for the Docker® engine. Build files may be generated according to standards governed by the Open Container Initiative (OCI), which allows for build files, container images, and the like, to be easily transferred between systems.

A build file may include a plurality of build instructions, such as RUN, ADD, and COPY. Each such instruction, when executed by a container engine, generate a container layer, also known as an intermediate layer. Intermediate layers are read-only layers, as any modification results in generation of a new layer. The top layer of a container image is also known as the container layer, upper layer, runtime layer, and so on., and is a layer which can be written to.

In an embodiment, the container engine 320 may receive input from a command line in the form of instructions. For example:

container-diff diff --type=apt --type=file image1 imageK when executed in the command line, will generate a diff 332. The diff 332 generated based on the above command includes objects and object identifiers, such as what operating system (OS) packages are installed, and what files have been added, deleted, or changed, between image1 310-1 and imageK 310-K. For example, an object may be a file, and a corresponding object identifier may include a directory path (or address) where the object is stored, and a file name or other identifier to identify the file within the directory.

The container-diff command is a GitHub® project which was created by Google®. It is noted that this example of a diff generating command is presented here merely for pedagogical purpose, and that another similar command, or group of commands, or equivalent command or group of commands, may be utilized within the scope of this disclosure. As another example, the container engine is configured to generate a diff 334 between a runtime layer 312 and an image layer 310-K, from which the runtime layer 312 was generated.

In an embodiment the diff outputs 332 and 334 are read by an inspector controller 340. The inspector controller 340 may be implemented as the inspector controller 260 of FIG. 2 above. The inspector controller 340 is configured to receive a diff file and is configured to generate instructions which when executed configure an inspector, such as the inspector 270 of FIG. 2 to inspect a container image, and an object which is selected from the diff output, wherein the diff output is partially based on the container image.

For example, the inspector controller 340 is further configured to receive the diff output 334 generated between runtime layer 312 and imageK 310-K. The diff output 334 includes, in this example, an object which corresponds to a file which was added in the runtime layer 312, and does not appear in the imageK 310-K. The inspector controller 340 is then configured to generate instructions which, when executed, configure an inspector to inspect the imageK 310-K and inspect the object from the diff output 334. By accessing only the object from the diff output 334, instead of inspecting the entire runtime layer 312, resource usage is reduced as explained above, and redundant inspections are eliminated.

As another example, the inspector controller 340 is configured to receive the diff output 332 generated between imageK 310-K and image1 310-1, upon which imageK 310-K is based. The diff output 332 includes, in this example, an object which corresponds to an installation package which was added to imageK 310-K, and does not appear in the image1 310-1. The inspector controller 340 is configured to generate instructions which, when executed, configure an inspector to inspect the image1 310-1 and inspect the object from the diff output 332. By accessing only the object from the diff output 332, instead of inspecting the entire imageK 310-K, resource usage is reduced as explained above, redundant inspections are eliminated, and where a cybersecurity threat is detected, it is possible to associate it exactly with a layer identifier.

Figure 4:
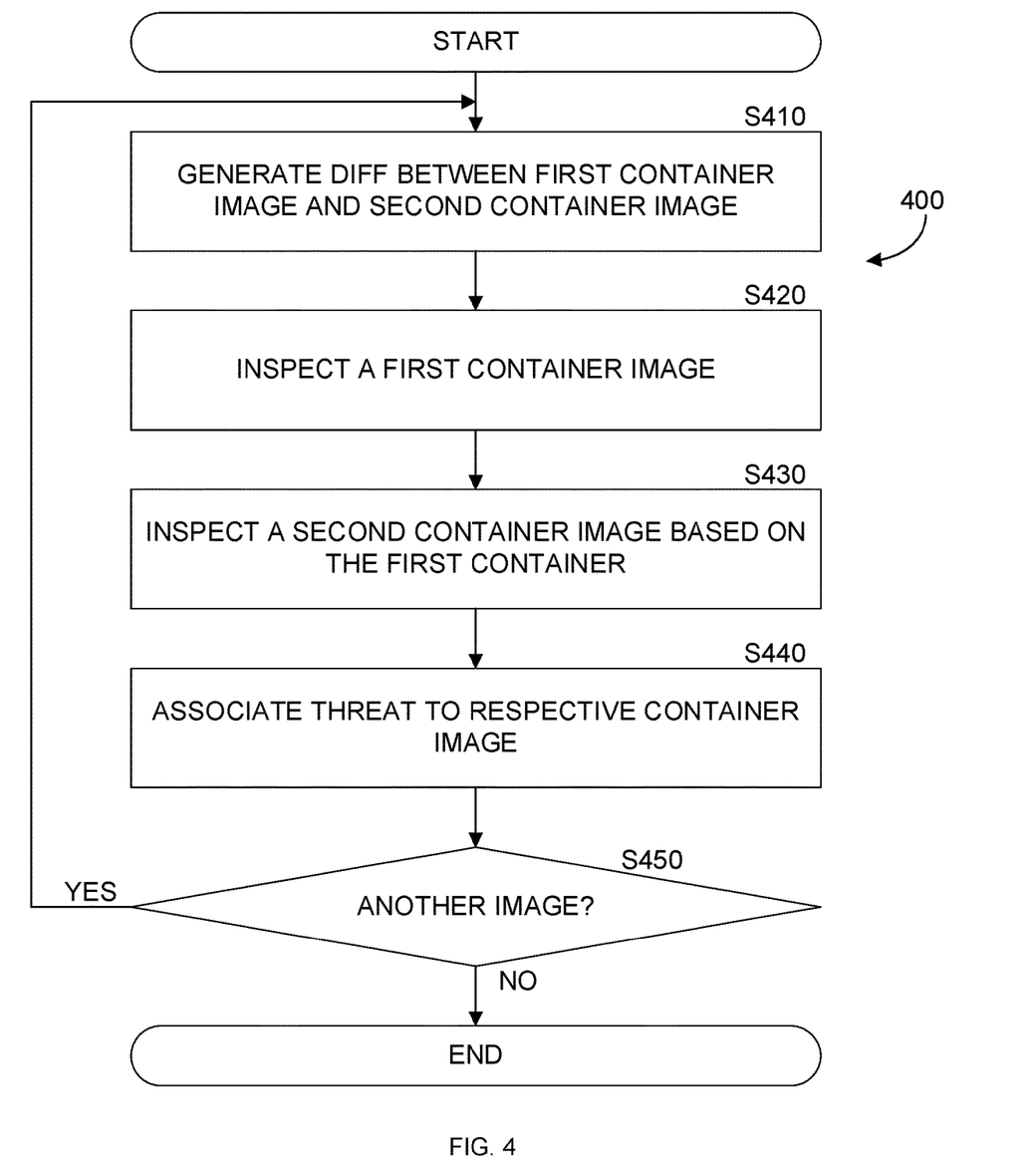
FIG. 4 is a flowchart for reducing redundancy in inspecting container layers for cybersecurity threats, implemented in accordance with an embodiment.

FIG. 4 is an example flowchart 400 for reducing redundancy in inspecting container layers for cybersecurity threats, implemented in accordance with an embodiment.

At S410, a diff output is generated between a first container image and a second container image. The first container image and the second container image are a part of a container build. In an embodiment, the second container image is based off of the first container image. The first container image may be based off of a base image, for example. In some embodiments, a diff output is generated by generating an instruction for a container engine, which when executed by the container engine generates the diff output. An example of such an instruction is included above in FIG. 3.

In an embodiment, a diff output includes objects and object identifiers, such as what operating system (OS) packages are installed, and what files have been added, deleted, or changed, between the first container image and the second container image. For example, an object may be a file, and a corresponding object identifier may include a directory path (or address) where the object is stored, and a file name or other identifier to identify the file within the directory. In some embodiments, a container repository, such as ECS, is accessed to pull container images therefrom.

At S420, the first container image is inspected for a cybersecurity threat. In an embodiment, the first container image may be inspected for other objects having a cybersecurity interest (also referred to as security objects). In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspection may be performed for security objects, such as files, folders, and the like. A security object may be, for example, a password stored in plaintext, a password stored in cleartext, a certificate, and the like. As another example, in an embodiment, a signature for a file, a folder, and the like is generated during an inspection. Such a signature is matched to another known signature. The known signature indicates a vulnerability. The signature may be generated, for example, using a checksum. In this example, a file having a checksum corresponding to a certain predetermined value is determined to have a predetermined known vulnerability.

At S430, the second container image is inspected for a cybersecurity threat. The second container image is based on the first container image, i.e., the first container image is a layer of the second container image. In order to efficiently inspect the second container image, objects are identified from the diff output. In an embodiment, inspecting the second container image includes identifying objects from the diff output, and inspecting at least a portion of the objects from the diff output. In certain embodiments, an object from the diff output may be inspected for a security object. A security objects may be, for example, a file, a folder, a password stored in plaintext, a password stored in cleartext, a certificate, and the like.

At S440, a detected cybersecurity threat is associated with a container image. In an embodiment, a detected security object is associated with the container image. Associating a cybersecurity threat with a container image includes, in an embodiment, generating in a security graph a node representing the cybersecurity threat, a node representing the container image, and generating an edge connected the cybersecurity threat node to the container image node.

In certain embodiments, the detected cybersecurity threat is associated with a container image in response to detecting that the cybersecurity threat is detected in the inspected container image, and is not detected in a container layer which is under the inspected container image. In the example of FIG. 1 above, if a cybersecurity threat is detected in first image 141 and not in second image 140-1, the detected cybersecurity threat is associated only with the first image 141.

In some embodiments, two container layers may be completely inspected. In such embodiments, if a cybersecurity threat is detected in a bottom image (layer) and not a top image (layer), the cybersecurity threat is associated with the bottom image. If the cybersecurity threat is detected in the top image and not detected in the bottom image, the cybersecurity threat is associated with the top image. If the cybersecurity threat is detected in both images, the cybersecurity threat is associated with the bottom image, as the top image includes the bottom image. In such embodiments, the detected cybersecurity threat is the same cybersecurity threat for both layers.

At S450, a check is performed to determine if another image should be inspected. If 'yes' execution may continue at S410, by selecting another image and generating a diff between the another image and one of the first container image or the second container image. If 'no', execution terminates.

By inspecting a bottom layer, and objects from a diff output generated between the bottom layer and an upper layer, redundant inspection is reduced, since the bottom layer is included as part of the upper layer.

Figure 5:
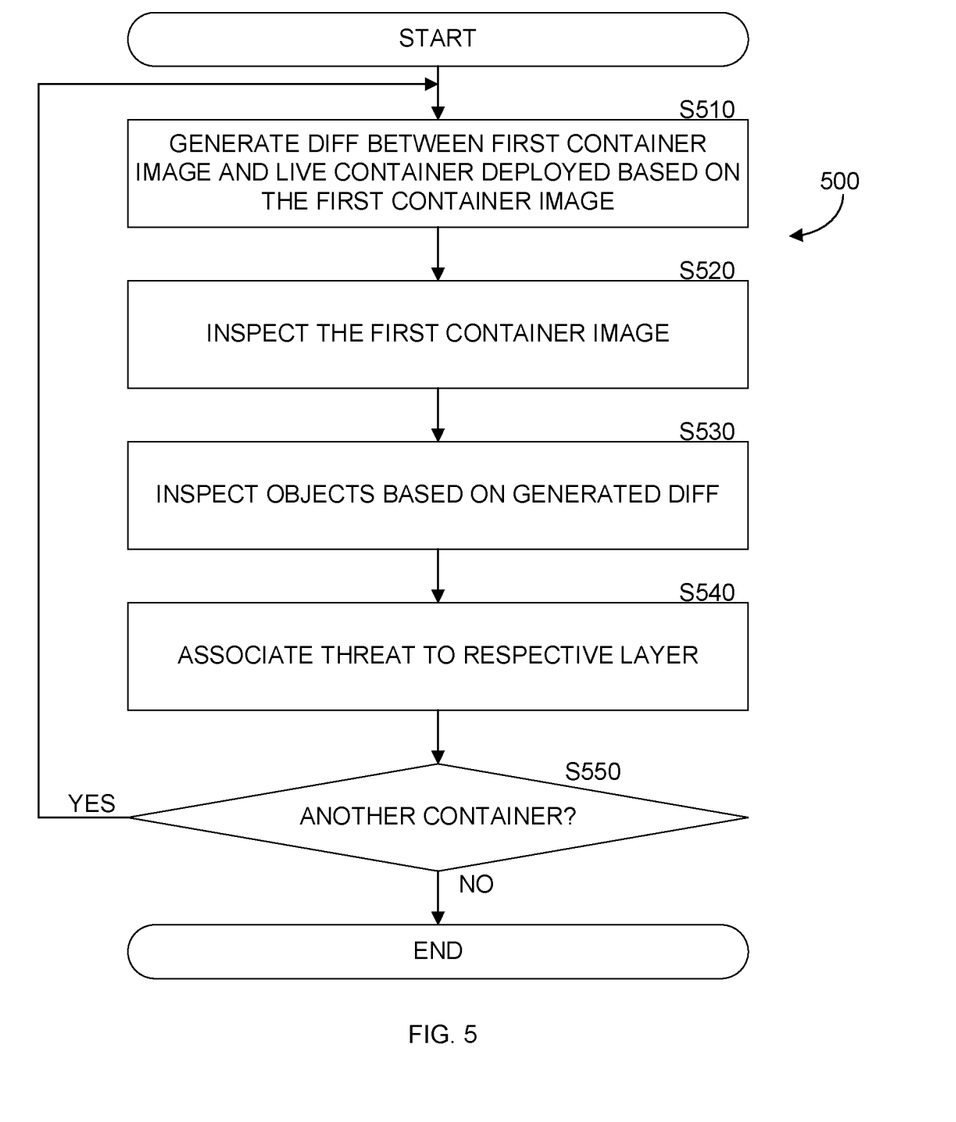
FIG. 5 is a flowchart of a method for reducing redundancy in inspecting a live container for cybersecurity threats, implemented in accordance with an embodiment.

FIG. 5 is an example flowchart 500 of a method for reducing redundancy in inspecting a live container for cybersecurity threats, implemented in accordance with an embodiment. Throughout this disclosure reference is made to inspecting containers, container images, layers, and the like for cybersecurity threats. It is noted in this regard that inspection for other objects of cybersecurity interest (i.e., security object) is also within the scope of this disclosure, whether or not such objects are directly considered a threat. For example, a vulnerability, an exposure, a misconfiguration, a malware object, a cryptocurrency miner, and the like, is a cybersecurity threat, while an OS, an application, a user account, and the like, are examples of security objects which are of cybersecurity interest, and may also be inspected for by an inspector.

At S510, a diff output is generated between a first container image and a live container. The live container (also known as a runtime layer) is deployed from a mount point of the first container image. In an embodiment, the first container image includes a plurality of layers. The first container image may be based off of a base image, for example. In some embodiments, a diff output is generated by generating an instruction for a container engine, which when executed by the container engine generates the diff output. An example of such an instruction is included above in FIG. 3.

In an embodiment, a diff output includes objects and object identifiers, such as what operating system (OS) packages are installed, and what files have been added, deleted, or changed, between the first container image and the live container. For example, an object may be a file, and a corresponding object identifier may include a directory path (or address) where the object is stored, and a file name or other identifier to identify the file within the directory. In some embodiments, a container repository, such as ECS, is accessed to pull a container image therefrom. In certain embodiments, a host VM may be accessed to read the container image (i.e., the live container) stored in a local cache of the host VM.

At S520, the first container image is inspected for a cybersecurity threat. In an embodiment, the first container image may be inspected for other objects having a cybersecurity interest (also referred to as security objects). In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspection may be performed for security objects, such as files, folders, and the like. A security object may be, for example, a password stored in plaintext, a password stored in cleartext, a certificate, and the like. As another example, in an embodiment, a signature for a file, a folder, and the like is generated during an inspection. Such a signature is matched to another known signature. The known signature indicates a vulnerability. The signature may be generated, for example, using a checksum. In this example, a file having a checksum corresponding to a certain predetermined value is determined to have a predetermined known vulnerability.

At S530, an object based on the generated diff is inspected for a cybersecurity threat. In order to efficiently inspect the live container, objects are identified from the diff output. In an embodiment, inspecting the live container includes identifying objects from the diff output, and inspecting at least a portion of the objects from the diff output for cybersecurity threats. In certain embodiments, an object from the diff output may be inspected for a security object. A security objects may be, for example, a file, a folder, a password stored in plaintext, a password stored in cleartext, a certificate, and the like.

At S540, a detected cybersecurity threat is associated with a layer. In an embodiment, a detected security object is associated with the layer. A layer may be any one of the container image (i.e., container layer) or the live container (i.e., runtime layer). Associating a cybersecurity threat with a layer includes, in an embodiment, generating in a security graph a node representing the cybersecurity threat, a node representing the container layer, and generating an edge connected the cybersecurity threat node to the container layer node.

In certain embodiments, the detected cybersecurity threat is associated with a container layer in response to detecting that the cybersecurity threat is detected in the runtime layer, and is not detected in the container layer from which the runtime layer was deployed. In the example of FIG. 1 above, if a cybersecurity threat is detected in image 140-N and not in container 150-1 which was deployed therefrom, the detected cybersecurity threat is associated only with the image 140-N.

At S550, a check is performed to determine if another container should be inspected. If 'yes' execution may continue at S510, by selecting another container image and generating a diff between the another container image and a runtime layer of a live container. If 'no', execution terminates.

By inspecting the first container image, and objects from a diff output generated between the first container image and a runtime layer of a live container, redundant inspection is reduced, since the first container image is included as part of the runtime layer.

Figure 6:
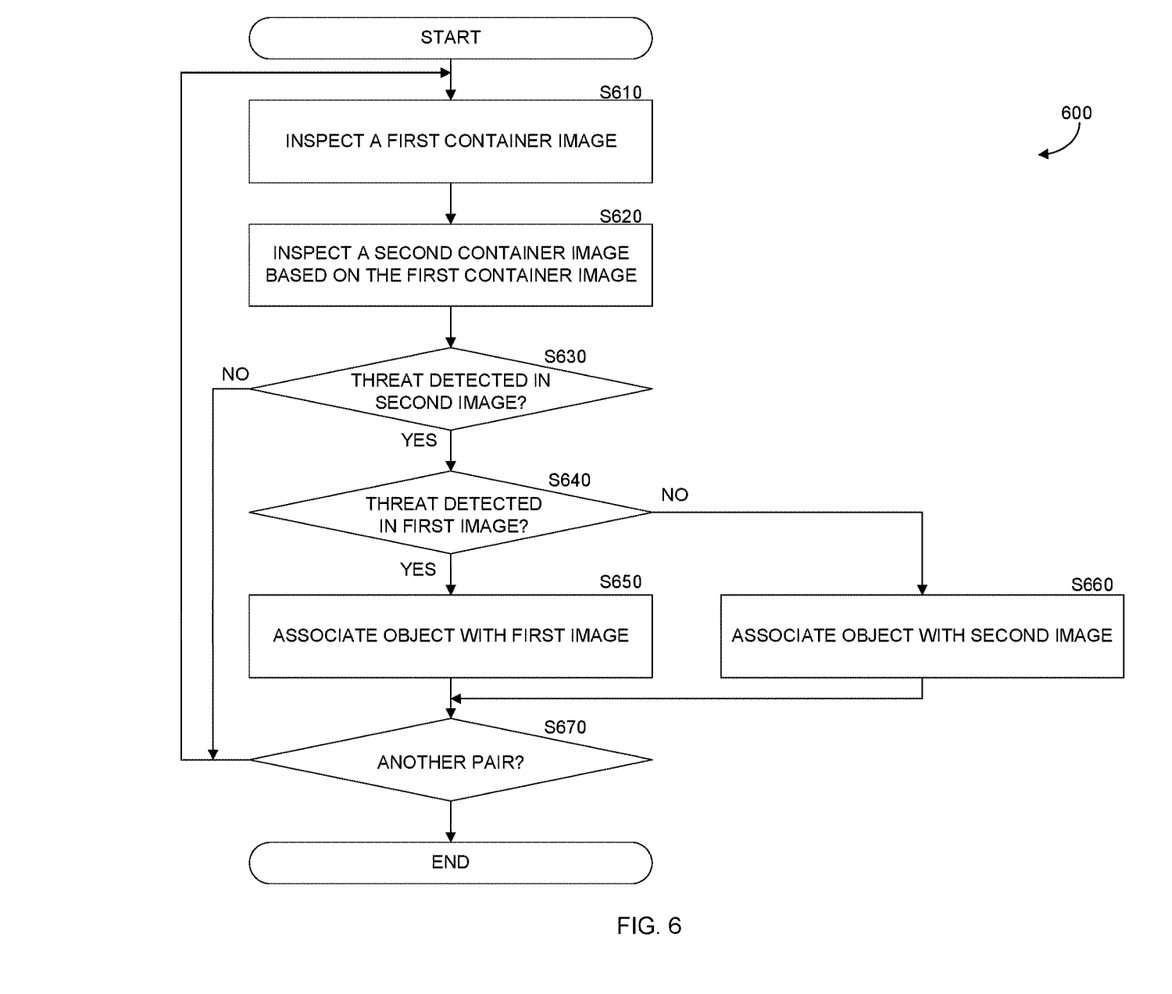
FIG. 6 is a flowchart of a method for layer by layer inspection of a an operating system level virtualization, implemented in accordance with an embodiment.

FIG. 6 is an example flowchart of a method for layer by layer inspection of a an operating system level virtualization, implemented in accordance with an embodiment.

At S610, a first container image is inspected. A container, as explained above, is an operating system level virtualization which includes an application and a dependency which is required to run the application. In an embodiment, the first container image is inspected for any one of: a cybersecurity object, and a cybersecurity threat. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspection may be performed for security objects, such as files, folders, and the like. A security object may be, for example, a password stored in plaintext, a password stored in cleartext, a certificate, and the like. As another example, in an embodiment, a signature for a file, a folder, and the like is generated during an inspection. Such a signature is matched to another known signature. The known signature indicates a vulnerability. The signature may be generated, for example, using a checksum. In this example, a file having a checksum corresponding to a certain predetermined value is determined to have a predetermined known vulnerability.

At S620, a second container image, which is previously generated based on the first container image, is inspected. The second container image is a container layer which is above the first container image. In an embodiment, the first container image is a base layer, and the second container image is an upper layer. In certain embodiments, the second container image is a next consecutive layer respective of the first container image. A container image is generated as the result of execution of a build instruction executed by, for example, a container engine. In an embodiment, the first container image is a read-only image.

At S630, a check is performed to determine if a threat was detected in the second container image. In some embodiments, the check is performed to determine if a cybersecurity object is detected, which is not a cybersecurity threat. If 'no', execution continues at S670. If 'yes' execution continues at S640.

At S640, a check is performed to determine if the threat was detected in the first container image. In some embodiments, the check is performed to determine if a cybersecurity object is detected, which is not a cybersecurity threat. If 'no', execution continues at S660. If 'yes', execution continues at S650.

At S650, the detected object is associated with the first container image. If a security object is detected in both images, then the origin of the object is in the first container image. This is due to the second container image including all the objects of the first container image, and any subsequent changes. Therefore, a security object, security threat, and the like, which appears in both layers, should be associated with the preceding layer, rather than the superseding layer, as the origin of the object must be in the preceding layer. In certain embodiments, where multiple layers, i.e., more than two, are inspected, an object is associated with the lowest layer in which the object is detected. For example, if an object is detected in a second layer, third layer, and fourth layer, but not in a first layer (where the first layer is a base image, and the fourth layer is the runtime layer), then the object should be associated with the second layer, as all superseding layers include therein the second layer.

In certain embodiments, associating a cybersecurity threat (or other object) with a layer includes generating in a security graph a node representing the cybersecurity threat, a node representing the container layer, and generating an edge connected the cybersecurity threat node to the container layer node.

At S660, the detected object is associated with the second container image. If a security object is detected in the second container image but not the first container image, then the origin of the object is in the second container image. This is due to the second container image including all the objects of the first container image, and any subsequent changes. Therefore, a security object, security threat, and the like, which appears in the second container image but not the first container image, should be associated with the superseding layer, rather than the preceding layer, as the origin of the object must be in the superseding layer.

In certain embodiments, where multiple layers, i.e., more than two, are inspected, an object is associated with the highest layer in which the object is detected. For example, if an object is detected in a third layer, but not a second layer or first layer (where the first layer is a base image, and the third layer is the runtime layer), then the object should be associated with the third layer, as all preceding layers do not include therein the cybersecurity threat.

In certain embodiments, associating a cybersecurity threat (or other object) with a layer includes generating in a security graph a node representing the cybersecurity threat, a node representing the container layer, and generating an edge connected the cybersecurity threat node to the container layer node.

Figure 7:
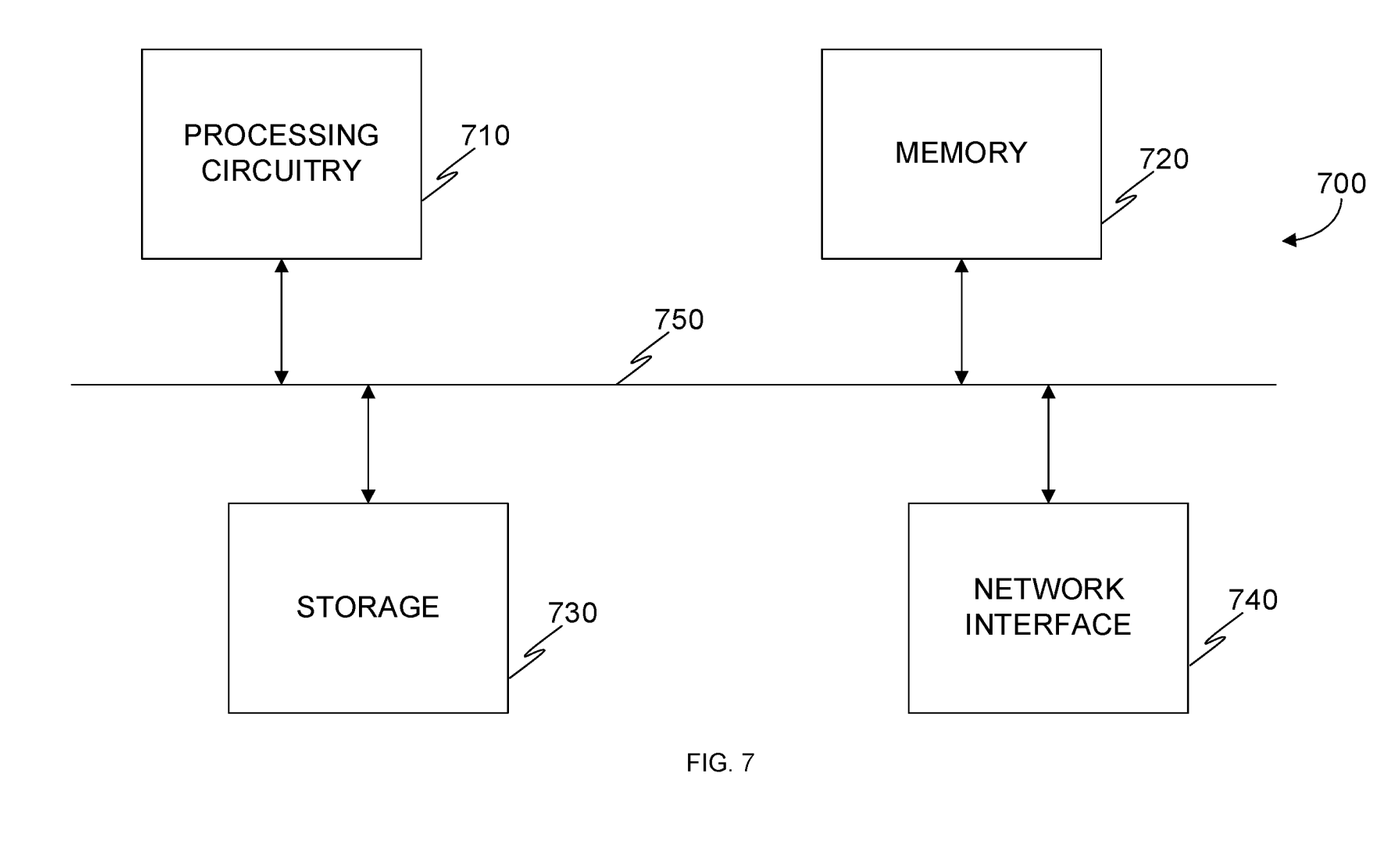
FIG. 7 is a schematic diagram of an inspection controller according to an embodiment.

FIG. 7 is an example schematic diagram of an inspection controller 260 according to an embodiment. The inspection controller 260 includes a processing circuitry 710 coupled to a memory 720, a storage 730, and a network interface 740. In an embodiment, the components of the inspection controller 260 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 710 to perform the various processes described herein.

The storage 730 may be magnetic storage, optical storage, and the like, and may be realized, for example, as flash memory or other memory technology, or any other medium which can be used to store the desired information.

The network interface 740 allows the inspection controller 260 to communicate with, for example, a security database 240, an inspector 270, a container engine 210, and the like.

It should be understood that the embodiments described herein are not limited to the specific architecture illustrated in FIG. 7, and other architectures may be equally used without departing from the scope of the disclosed embodiments. Similarly, the architecture illustrated in FIG. 7 may be utilized in deploying an inspector 270, a container engine 210, a virtual machine 230, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a cybersecurity object in operating system-level virtualization objects, comprising:
   inspecting in a computing environment a first image of an operating system-level virtualization for the cybersecurity object;
   inspecting in the computing environment a second image for the cybersecurity object, wherein the second image is based off of the first image;
   associating the cybersecurity object with the first image in a security graph, in response to detecting the cybersecurity object in the first image and detecting the cybersecurity object in the second image;
   associating the cybersecurity object with the second image in the security graph, in response to detecting the cybersecurity object in the second image and not detecting the cybersecurity object in the first image;
   generating a plurality of nodes in the security graph, each node of the plurality of nodes uniquely representing: the first image, the second image, and the cybersecurity object; and
   initiating a mitigating action in the computing environment based on the cybersecurity object.

2. The method of claim 1, wherein the operating system-level virtualization includes a container engine.

3. The method of claim 1, wherein the cybersecurity object is any one of: a vulnerability, an exposure, a misconfiguration, a malware object, a cryptocurrency miner, a ransomware, a spyware, a bot, a weak password, an exposed password, an exposed certificate, and an outdated certificate.

4. The method of claim 1, wherein the cybersecurity object is any one of: an OS, an application, a user account, a password stored in plaintext, a password stored in cleartext, and a certificate.

5. The method of claim 1, wherein the first image and the second image are generated each based on a build instruction of a common build.

6. The method of claim 1, wherein the first image is a read only image, and the second image is a writable image.

7. The method of claim 1, wherein associating the cybersecurity object with the first image further comprises:
   generating an edge between a node representing the cybersecurity object and a node representing the first image.

8. The method of claim 1, wherein associating the cybersecurity object with the second image further comprises:
   generating an edge between a node representing the cybersecurity object and a node representing the second image.

9. A non-transitory computer readable medium having stored thereon instructions for causing a processing circuitry to execute a process, the process comprising:
   inspect in a computing environment a first image of an operating system-level virtualization for a cybersecurity object;
   inspect in the computing environment a second image for the cybersecurity object, wherein the second image is based off of the first image;
   associate the cybersecurity object with the first image in a security graph, in response to detecting the cybersecurity object in the first image and detecting the cybersecurity object in the second image;
   associate the cybersecurity object with the second image in the security graph, in response to detecting the cybersecurity object in the second image and not detecting the cybersecurity object in the first image;
   generate a plurality of nodes in the security graph, each node of the plurality of nodes uniquely representing: the first image, the second image, and the cybersecurity object; and
   initiate a mitigating action in the computing environment based on the cybersecurity object.

10. A system for detecting a cybersecurity object in operating system-level virtualization objects, comprising:
    a processing circuitry; and
    a memory, the memory containing instructions that, when executed by the processing circuitry, configure the system to:
    inspect in a computing environment a first image of an operating system-level virtualization for the cybersecurity object;
    inspect in the computing environment a second image for the cybersecurity object, wherein the second image is based off of the first image;
    associate the cybersecurity object with the first image in a security graph, in response to detecting the cybersecurity object in the first image and detecting the cybersecurity object in the second image;
    associate the cybersecurity object with the second image in the security graph, in response to detecting the cybersecurity object in the second image and not detecting the cybersecurity object in the first image;
    generate a plurality of nodes in the security graph, each node of the plurality of nodes uniquely representing: the first image, the second image, and the cybersecurity object; and
    initiate a mitigating action in the computing environment based on the cybersecurity object.

11. The system of claim 10, wherein the operating system-level virtualization includes a container engine.

12. The system of claim 10, wherein the cybersecurity object is any one of: a vulnerability, an exposure, a misconfiguration, a malware object, a cryptocurrency miner, a ransomware, a spyware, a bot, a weak password, an exposed password, an exposed certificate, and an outdated certificate.

13. The system of claim 10, wherein the cybersecurity object is any one of: an OS, an application, a user account, a password stored in plaintext, a password stored in cleartext, and a certificate.

14. The system of claim 10, wherein the first image and the second image are generated each based on a build instruction of a common build.

15. The system of claim 10, wherein the first image is a read only image, and the second image is a writable image.

16. The system of claim 10, wherein the memory contains further instructions, that when executed by the processing circuitry to associate the cybersecurity object with the first image, further configure the system to:
    generate an edge between a node representing the cybersecurity object and a node representing the first image.

17. The system of claim 10, wherein the memory contains further instructions, that when executed by the processing circuitry to associate the cybersecurity object with the second image, further configure the system to:

generate an edge between a node representing the cybersecurity object and a node representing the second image.

\* \* \* \* \*